United States Patent
Suzuki et al.

(10) Patent No.: US 8,776,920 B2
(45) Date of Patent: Jul. 15, 2014

(54) REAR PROTECTION STRUCTURE FOR VEHICLE

(75) Inventors: Akira Suzuki, Anjo (JP); Yuzo Niina, Anjo (JP); Yoshihiro Sakaguchi, Anjo (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 13/806,678

(22) PCT Filed: Jul. 29, 2011

(86) PCT No.: PCT/JP2011/067413
§ 371 (c)(1), (2), (4) Date: Dec. 21, 2012

(87) PCT Pub. No.: WO2012/017935
PCT Pub. Date: Feb. 9, 2012

(65) Prior Publication Data
US 2013/0112491 A1 May 9, 2013

(30) Foreign Application Priority Data
Aug. 3, 2010 (JP) ................................. 2010-174337

(51) Int. Cl.
*B60K 6/40* (2007.10)
*B62D 21/11* (2006.01)
*B60K 17/356* (2006.01)
*B60K 1/04* (2006.01)

(52) U.S. Cl.
CPC . *B60K 6/40* (2013.01); *B62D 21/11* (2013.01); *B60K 17/356* (2013.01); *B60K 1/04* (2013.01)
USPC ...................... 180/65.21; 180/311; 180/65.31; 180/291; 180/65.22

(58) Field of Classification Search
CPC combination set(s) only.
See application file for complete search history.

(56) References Cited

U.S. PATENT DOCUMENTS

2006/0102398 A1* 5/2006 Mizuno ........................ 180/65.3

FOREIGN PATENT DOCUMENTS

| JP | 2004-127747 A | 4/2004 |
| JP | 2006-88871 A | 4/2006 |
| JP | 2008-195259 A | 8/2008 |
| JP | 2010-137806 A | 6/2010 |

OTHER PUBLICATIONS

International Search Report, dated Sep. 13, 2011, issued in PCT/JP2011/067413.
Written Opinion of the International Searching Authority, dated Sep. 13, 2011, issued in PCT/JP2011/067413.

* cited by examiner

*Primary Examiner* — Katy M Ebner
*Assistant Examiner* — Hilary L Johns
(74) *Attorney, Agent, or Firm* — Birch, Stewart, Kolasch & Birch, LLP

(57) ABSTRACT

A rear protection structure is provided for a vehicle which is equipped with an engine and a rear wheel-driving motor each as a traveling-driving power source of the vehicle and in which the rear wheel-driving motor is arranged between left and right rear wheels and of the vehicle, and a fuel tank for the engine and the rear wheel-driving motor are arranged adjacent to each other in the longitudinal direction of the vehicle. A rear suspension supporting the rear wheel-driving motor has a suspension member with an octothorpe-like shape, and the rear wheel-driving motor and high-voltage lines connected to the rear wheel-driving motor are arranged within a space enclosed by the suspension member.

10 Claims, 4 Drawing Sheets

REAR PROTECTION STRUCTURE FOR VEHICLE

BACKGROUND ART

1. Field of the Invention

The present invention relates to rear structures of vehicles, and more particularly, to techniques for protecting a rear wheel-driving motor and a fuel tank at the time of a rear-end collision.

2. Description of the Related Art

To achieve the above object, a first aspect of the invention provides a rear protection structure for a vehicle which is equipped with an engine and a rear wheel-driving motor each as a traveling-driving power source of the vehicle and in which the rear wheel-driving motor is arranged between right and left rear wheels of the vehicle, and a fuel tank for the engine and the rear wheel-driving motor are arranged adjacent to each other in a longitudinal direction of the vehicle, wherein a rear suspension supporting the rear wheel-driving motor has a suspension member with an octothorpe-like shape, and the rear wheel-driving motor and an electric power supply line connected to the rear wheel-driving motor are arranged within a space enclosed by the suspension member.

In a second aspect of the invention, the electric power supply line is connected to the rear wheel-driving motor at a location opposite the fuel tank.

In a third aspect of the invention, the rear wheel-driving motor is supplied with electric power via the electric power supply line from a control unit for controlling operation of the rear wheel-driving motor, the control unit is arranged above the rear wheel-driving motor, and the electric power supply line is connected to the control unit at a location within the space enclosed by the suspension member.

PRIOR ART DOCUMENTS

Patent Documents

Patent Document 1: Japanese Laid-open Patent Publication No. 2008-195259

SUMMARY OF THE INVENTION

Problems to be Solved by the Invention

When a vehicle in which the motor is arranged between the right and left rear wheels and the fuel tank is located in front of the motor, like the one disclosed in Patent Document 1, is run into from behind, the motor is pushed forward into contact with the fuel tank and possibly damages the fuel tank.

Also, the motor is connected with electric power supply lines through which driving electric power is supplied from a control unit for controlling the operation of the motor. Thus, if the motor is moved when the following vehicle runs into the vehicle from behind, it is possible that the electric power supply lines connected to the motor may be cut or damaged, possibly creating a situation where the exposed electric power supply lines come into contact with the damaged fuel tank.

The present invention was made to solve the above problem, and an object thereof is to provide a rear protection structure applied to a vehicle which is equipped with an engine and of which rear wheels are driven by a motor, and capable of protecting the motor and a fuel tank when the vehicle is run into from behind.

Means for Solving the Problems

To achieve the above object, the invention as recited in claim 1 provides a rear protection structure for a vehicle which is equipped with an engine and a rear wheel-driving motor each as a traveling-driving power source of the vehicle and in which the rear wheel-driving motor is arranged between right and left rear wheels of the vehicle, and a fuel tank for the engine and the rear wheel-driving motor are arranged adjacent to each other in a longitudinal direction of the vehicle, wherein a rear suspension supporting the rear wheel-driving motor has a suspension member with an octothorpe-like shape, and the rear wheel-driving motor and an electric power supply line connected to the rear wheel-driving motor are arranged within a space enclosed by the suspension member.

In the invention as recited in claim 2, the electric power supply line is connected to the rear wheel-driving motor at a location opposite the fuel tank.

In the invention as recited in claim 3, the rear wheel-driving motor is supplied with electric power via the electric power supply line from a control unit for controlling operation of the rear wheel-driving motor, the control unit is arranged above the rear wheel-driving motor, and the electric power supply line is connected to the control unit at a location within the space enclosed by the suspension member.

Advantageous Effects of the Invention

According to the first aspect of the invention, the rear wheel-driving motor and the electric power supply line connected to the rear wheel-driving motor are arranged within the space enclosed by the suspension member having an octothorpe-like shape. Thus, when the vehicle is run into from behind or another vehicle runs into a side portion of the vehicle near the rear wheel, the rear wheel-driving motor and the electric power supply line are protected by the suspension member having relatively high rigidity. Also, the rear wheel-driving motor supported by the suspension member is restrained from moving at the time of the rear-end collision. Thus, where the fuel tank is arranged in front of the motor, for example, the rear wheel-driving motor and the electric power supply line are prevented from coming into contact with the fuel tank, whereby the fuel tank can be protected.

According to the second aspect of the invention, the electric power supply line is connected to the rear wheel-driving motor at a location opposite the fuel tank, and accordingly, even if the rear wheel-driving motor or the fuel tank is moved forward at the time of the rear-end collision, the electric power supply line can be reliably prevented from coming into contact with the fuel tank.

According to the third aspect of the invention, the electric power supply line is connected to the control unit at a location within the space enclosed by the suspension member. Since the electric power supply line, inclusive of its connecting portion connected to the control unit, is located within the space enclosed by the suspension member, it is possible to prevent the connecting portion of the electric power supply line from undergoing shear fracture at the time of rear-end collision or lateral collision.

DETAILED DESCRIPTION OF THE INVENTION

An embodiment of the present invention will be described below with reference to the drawings.

Figure 1:
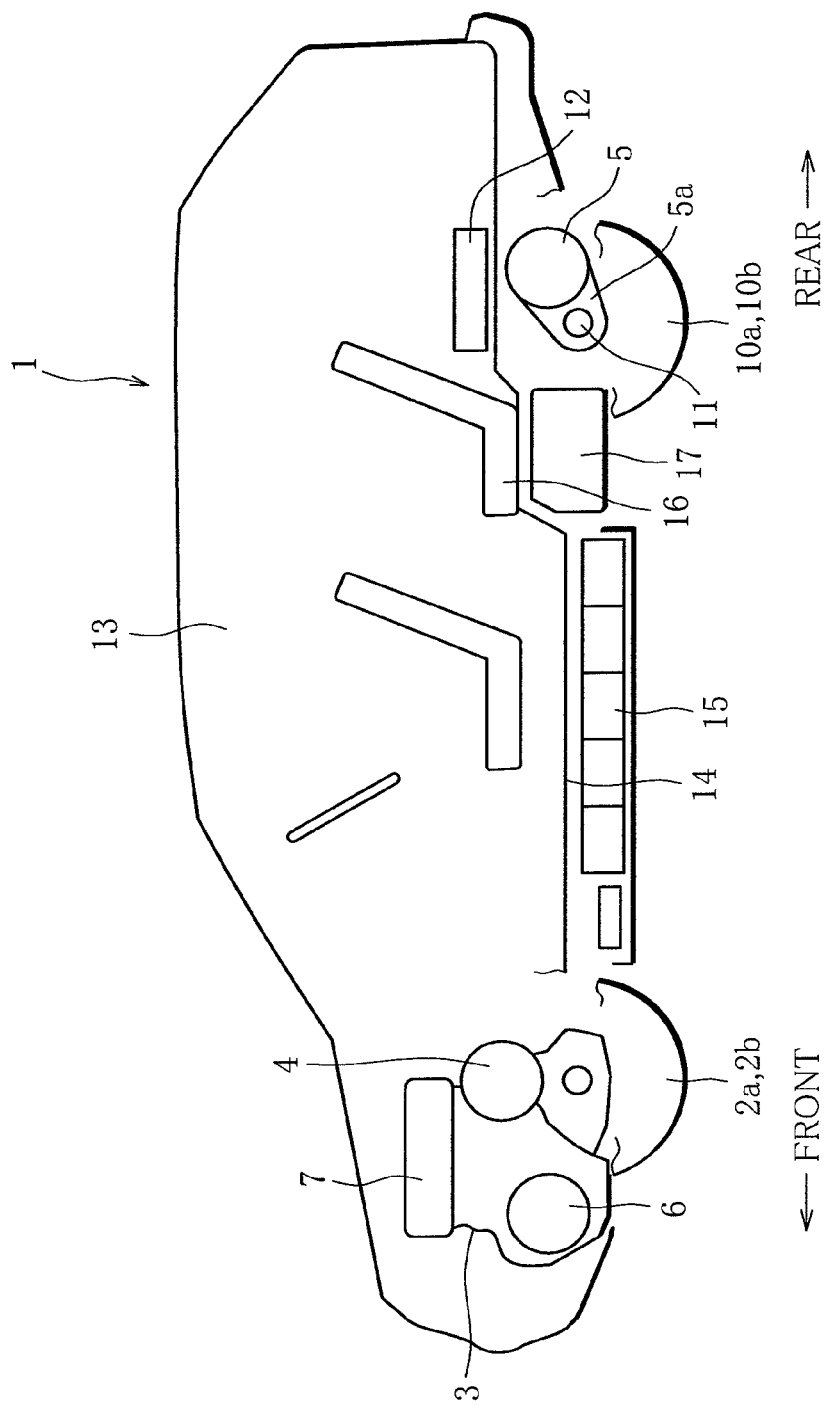
FIG. 1 is a side view illustrating the arrangement of traveling-driving devices of a vehicle according to one embodiment of the present invention.

FIG. 1 is a side view illustrating the arrangement of traveling-driving devices of a vehicle according to the embodiment of the present invention.

As illustrated in FIG. 1, a vehicle 1 to which a motor protection structure according to the embodiment of the present invention is applied is a four-wheel-drive hybrid vehicle equipped with an engine 3 for driving front wheels 2a and 2b, a front wheel-driving motor 4, and a rear wheel-driving motor 5.

The engine 3, the front wheel-driving motor 4, and a generator 6, which is driven by the engine 3 to generate electricity, are arranged between the left and right front wheels 2a and 2b of the vehicle. A front motor control unit 7 for controlling the operation of the front wheel-driving motor 4 is arranged above the front wheel-driving motor 4.

The rear wheel-driving motor 5 is arranged between left and right rear wheels 10a and 10b of the vehicle 1. The rear wheel-driving motor 5 is combined with a speed reducer 5a into a unit and is capable of driving the left and right rear wheels 10a and 10b through a drive shaft 11. A rear motor control unit 12 for controlling the operation of the rear wheel-driving motor 5 is arranged above the rear wheel-driving motor.

A motor-driving battery 15, which is a driving power source for the front wheel- and rear wheel-driving motors 4 and 5, is arranged under a floor 14 of a passenger compartment 13. The motor-driving battery 15 is connected to the front wheel-driving motor 4 through the front motor control unit 7, and is also connected to the rear wheel-driving motor 5 through the rear motor control unit 12. The front and rear motor control units 7 and 12 are each constituted by an inverter, a battery charger, a DC-DC converter and the like and configured to boost the electric power supplied from the motor-driving battery 15 and supply the boosted electric power to the corresponding one of the front wheel- and rear wheel-driving motors 4 and 5 to control the operation of the motor 4, 5. Also, when the vehicle is decelerating, the front and rear motor control units 7 and 12 regenerate electric power by means of the front wheel- and rear wheel-driving motors 4 and 5, respectively, so that the motor-driving battery 15 may be charged with the regenerated electric power. Further, the motor-driving battery 15 can be charged with the electric power generated by the generator 6, which is driven by the engine 3.

A fuel tank 17 for the engine 3 is arranged under rear seats 16 of the vehicle 1. The fuel tank 17 is located behind the motor-driving battery 15 and in front of the rear wheel-driving motor 5 and is positioned at nearly the same level, or the same height, as the rear wheel-driving motor 5.

Figure 2:
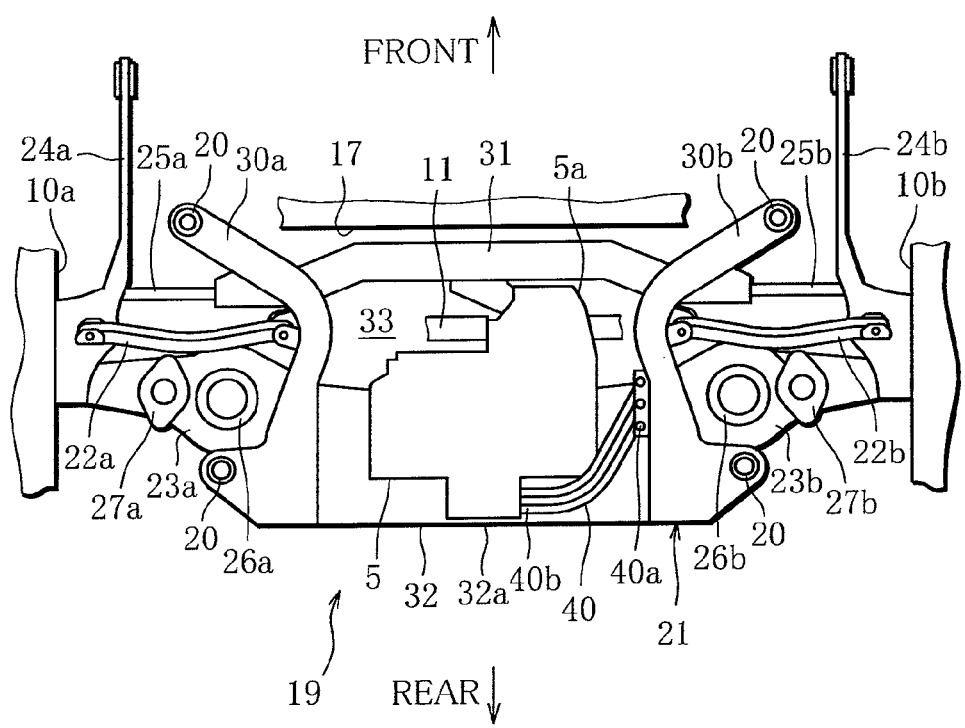
FIG. 2 is a plan view illustrating the structure of a rear section of the vehicle according to the embodiment of the present invention.
Figure 3:
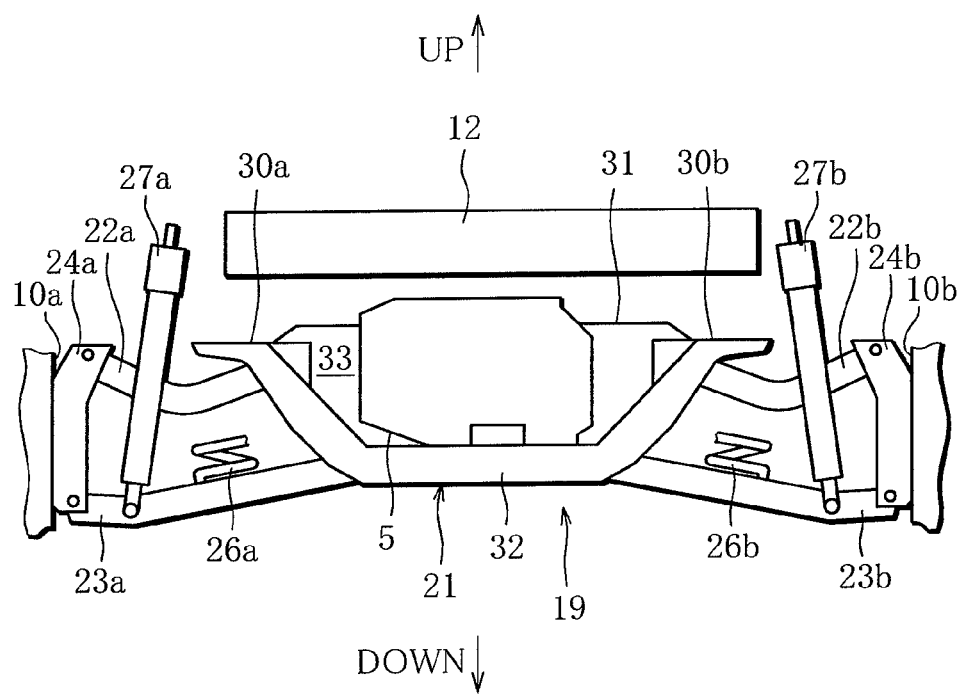
FIG. 3 is a rear view illustrating the structure of the rear section of the vehicle according to the embodiment of the present invention.
Figure 4:
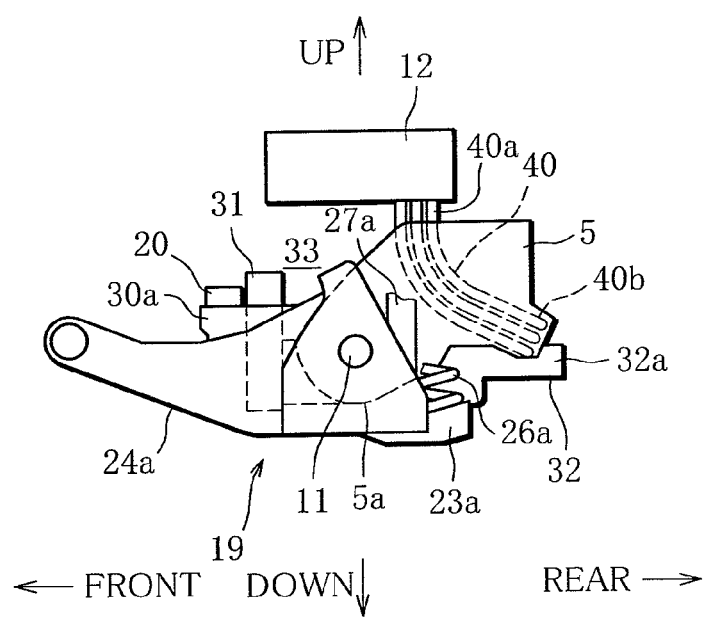
FIG. 4 is a right side view illustrating the arrangement of high-voltage lines according to the embodiment of the present invention.

FIGS. 2 and 3 schematically illustrate the structure of a rear section of the vehicle, more particularly, a rear suspension 19, wherein FIG. 2 is a plan view and FIG. 3 is a rear view. FIG. 4 is a side view illustrating the arrangement of high-voltage lines 40.

According to this embodiment, as illustrated in FIGS. 2 to 4, the rear suspension 19 of the vehicle 1 is a multi-link suspension including a suspension member 21 supported on the vehicle body by rubber bushings 20, upper links 22a and 22b, lower links 23a and 23b, trailing arms 24a and 24b, toe control links 25a and 25b, and coil springs 26a and 26b and dampers 27a and 27b arranged between the vehicle body and the respective lower links 23a and 23b.

The suspension member 21 supporting the links 22a, 22b, 23a, 23b, 25a and 25b is constituted by left and right side members 30a and 30b extending in the longitudinal direction of the vehicle and spaced from each other in the lateral or width direction of the vehicle, a first rear cross member 31 connecting front portions of the left and right side members 30a and 30b to each other and extending in the width direction of the vehicle, and a second rear cross member 32 connecting rear portions of the left and right side members 30a and 30b to each other and extending in the width direction of the vehicle. These members 30a, 30b, 31 and 32 have high rigidity and form an octothorpe-like shape, or a crosshatch-like shape, of the suspension member 21. Thus, the suspension member 21 has a space 33 formed therein and surrounded by the left and right side members 30a and 30b and the first and second rear cross members 31 and 32.

The suspension member 21 supports the rear wheel-driving motor 5. Specifically, the second rear cross member 32 of the suspension member 21 is located under the rear wheel-driving motor 5 and supports a rear lower portion of the rear wheel-driving motor 5. The first rear cross member 31 of the suspension member 21 is set up in front of the rear wheel-driving motor 5, extends in the width direction of the vehicle so as to separate the rear wheel-driving motor 5 and the fuel tank 17 from each other, and supports a front portion of the rear wheel-driving motor 5.

The rear motor control unit 12, which controls the supply of driving electric power to the rear wheel-driving motor 5, is generally in the form of a rectangular parallelepiped and arranged above the left and right side members 30a and 30b so as to extend in the width direction of the vehicle. The high-voltage lines 40 (electric power supply lines) for supplying electric power from the rear motor control unit 12 to the rear wheel-driving motor 5 are located in their entirety within the space 33 enclosed by the suspension member 21. Specifically, the high-voltage lines 40, inclusive of connecting portions 40a and 40b at their opposite ends, are located within the space 33 surrounded by the left and right side members 30a and 30b and the first and second rear cross members 31 and 32. The connecting portions 40a where the high-voltage lines 40 are connected to the rear motor control unit 12 are located between the rear wheel-driving motor 5 and the right side member 30b and connected to a lower surface of the rear motor control unit 12. The connecting portions 40b where the high-voltage lines 40 are connected to the rear wheel-driving motor 5 are located on a rear surface of the rear wheel-driving motor 5 and connected to the motor 5 at a location in front of a rear end face 32a of the second rear cross member 32. The high-voltage lines 40 connected to the rear wheel-driving motor 5 through the connecting portions 40b extend behind the rear wheel-driving motor 5 and in front of the rear end face 32a of the second rear cross member 32 to the right of the vehicle, then extend upward and forward between the rear wheel-driving motor 5 and the right side member 30b, and are connected to the rear motor control unit 12.

In this embodiment, the rear wheel-driving motor 5 is arranged in the space 33 enclosed by the high-rigidity suspension member 21 as stated above, and accordingly, it is possible to prevent the rear wheel-driving motor 5 from being damaged when the following vehicle runs into the vehicle from behind or when a vehicle runs into a side portion of the vehicle near the rear wheel. In particular, the first rear cross member 31 is arranged such that the rear wheel-driving motor 5 and the fuel tank 17, which are arranged adjacent to each other in the longitudinal direction of the vehicle, are set apart from each other by the first rear cross member 31. Thus, even if the rear wheel-driving motor 5 is pushed forward at the time of rear-end collision, the first rear cross member 31 stops the rear wheel-driving motor 5 from coming into contact with the fuel tank 17, whereby damage to the fuel tank 17 can be prevented.

The high-voltage lines 40 connecting the rear motor control unit 12 to the rear wheel-driving motor 5 are also located in the space 33 enclosed by the high-rigidity suspension member 21, and therefore, it is possible to prevent the high-voltage lines 40 from being damaged at the time of rear-end collision or lateral collision.

Further, the high-voltage lines 40 are connected to the rear portion of the rear wheel-driving motor 5 located opposite the fuel tank 17. Thus, even if the rear wheel-driving motor 5 is moved forward at the time of collision and the high-voltage lines 40 are damaged and exposed, the high-voltage lines 40 are less liable to come into direct contact with the fuel tank 17 for structural reasons, so that the fuel in the fuel tank 17 is unlikely to catch fire.

Also, the connecting portions 40a connecting the high-voltage lines 40 to the rear motor control unit 12 are located, together with the high-voltage lines 40 themselves, within the space 33 enclosed by the suspension member 21. It is therefore possible to prevent the connecting portions 40a from undergoing shear fracture at the time of rear-end collision or lateral collision.

Although in the above embodiment, the fuel tank 17 is arranged in front of the rear wheel-driving motor 5, the invention is also applicable to a vehicle in which the fuel tank 17 is arranged behind the rear wheel-driving motor 5.

Also, in the above embodiment, the present invention is applied to the vehicle equipped with the multi-link rear suspension 19 but can also be applied to any vehicle insofar as the rear suspension has a space formed therein and surrounded by high-rigidity members.

Further, in the foregoing embodiment, the present invention is applied to the four-wheel-drive hybrid vehicle equipped with the front wheel-driving motor 4 and the rear wheel-driving motor 5. However, the type of vehicle to which the present invention is applicable is not limited to such a type alone, and the invention may be applied, for example, to vehicles in which the rear wheel-driving motor and the engine are arranged adjacent to each other in the longitudinal direction of the vehicle, such as a hybrid vehicle of which the rear wheels alone are driven by a motor.

EXPLANATION OF REFERENCE SIGNS

1: vehicle
5: rear wheel-driving motor
12: rear motor control unit
17: fuel tank
19: rear suspension
21: suspension member
31: first rear cross member
32: second rear cross member
40: high-voltage line
40a, 40b: connecting portion

The invention claimed is:

1. A rear protection structure for a vehicle which is equipped with an engine and a rear wheel-driving motor each as a traveling-driving power source of the vehicle and in which the rear wheel-driving motor and a rear suspension are arranged in a rear section of the vehicle and between right and left rear wheels of the vehicle, and a fuel tank for the engine and the rear wheel-driving motor are arranged adjacent to each other in a longitudinal direction of the vehicle, wherein:
the rear suspension supporting the rear wheel-driving motor has a suspension member supported on a body of the vehicle by rubber bushings, the suspension member defining a space having an octothorpe-like shape, the space being formed by,
right and left side members extending in the longitudinal direction of the vehicle,
a first rear cross member connecting front portions of the right and left side members to each other and extending in a width direction of the vehicle, and
a second rear cross member connecting rear portions of the right and left side members to each other and extending in the width direction of the vehicle,
the fuel tank is arranged in front of the rear wheel-driving motor with respect to the vehicle,
the first rear cross member is set up in front of the rear wheel-driving motor so as to extend between the rear wheel-driving motor and the fuel,
the rear wheel-driving motor and an electric power supply line connected to the rear wheel-driving motor are arranged within the space defined by the suspension member, and the electric power supply line is provided on a rear surface of the rear wheel-driving motor located opposite the fuel tank with respect to the longitudinal direction of the vehicle and is connected to the rear wheel-driving motor at a location in front of a rear end face of the second rear cross member.

2. The rear protection structure according to claim 1, wherein:
the second rear cross member is located under the rear wheel-driving motor and supports a rear lower portion of the rear wheel-driving motor, and
a connecting portion where the electric power supply line is connected to the rear wheel-driving motor is located in front of a rear end of the rear wheel-driving motor and overlaps the second rear cross member one upon another in plan view.

3. The rear protection structure according to 1, wherein:
the rear wheel-driving motor is supplied with electric power via the electric power supply line from a rear motor control unit arranged above the rear wheel-driving motor, the rear motor control unit controls operation of the rear wheel-driving motor, and
the electric power supply line is connected to the rear motor control unit at a location within the space defined by the suspension member.

4. The rear protection structure according to 2, wherein:
the rear wheel-driving motor is supplied with electric power via the electric power supply line from a rear motor control unit arranged above the rear wheel-driving motor, the rear motor control unit controls operation of the rear wheel-driving motor, and
the electric power supply line is connected to the rear motor control unit at a location within the space defined by the suspension member.

5. A rear protection structure for a vehicle which is equipped with an engine and a rear wheel-driving motor each as a traveling-driving power source of the vehicle and in which the rear wheel-driving motor and a rear suspension are arranged in a rear section of the vehicle and between right and left rear wheels of the vehicle, and a fuel tank for the engine and the rear wheel-driving motor are arranged adjacent to each other in a longitudinal direction of the vehicle, wherein:
the rear suspension supporting the rear wheel-driving motor has a suspension member supported on a body of the vehicle by rubber bushings, the suspension member defining a space having an octothorpe-like shape, the space being formed by,
right and left side members extending in the longitudinal direction of the vehicle,
a first rear cross member connecting front portions of the right and left side members to each other and extending in a width direction of the vehicle, and
a second rear cross member connecting rear portions of the right and left side members to each other and extending in the width direction of the vehicle,
the fuel tank is arranged in front of the rear wheel-driving motor with respect to the vehicle,
the first rear cross member is set up in front of the rear wheel-driving motor so as to extend between the rear wheel-driving motor and the fuel tank,
the rear wheel-driving motor is arranged within the space defined by the suspension member.

6. The rear protection structure according to claim 5, wherein:
the second rear cross member is located under the rear wheel-driving motor and supports a rear lower portion of the rear wheel-driving motor.

7. A rear protection structure for a vehicle which is equipped with an engine and a rear wheel-driving motor each as a traveling-driving power source of the vehicle and in which the rear wheel-driving motor and a rear suspension are arranged in a rear section of the vehicle and between right and left rear wheels of the vehicle, and a fuel tank for the engine and the rear wheel-driving motor are arranged adjacent to each other in a longitudinal direction of the vehicle, wherein:
the rear suspension supporting the rear wheel-driving motor has a suspension member supported on a body of the vehicle by rubber bushings, the suspension member defining a space formed by,
right and left side members extending in the longitudinal direction of the vehicle,
a first rear cross member connecting front portions of the right and left side members to each other and extending in a width direction of the vehicle, and
a second rear cross member connecting rear portions of the right and left side members to each other and extending in the width direction of the vehicle,
the fuel tank is arranged in front of the rear wheel-driving motor with respect to the vehicle,
the first rear cross member is set up in front and the rear wheel-driving motor so as to extend between the rear wheel-driving motor and the fuel tank,
the rear wheel-driving motor and an electric power supply line connected to the rear wheel-driving motor are arranged within the space defined by the suspension member, and a connecting portion of the electric power supply line is provided on a rear surface of the rear wheel-driving motor located opposite the fuel tank with respect to the longitudinal direction of the vehicle and is connected to the rear wheel-driving motor at a location in front of a rear end face of the second rear cross member,
the rear wheel-driving motor is supplied with electric power via the electric power supply line from a rear motor control unit arranged above the rear wheel-driving motor, the rear motor control unit controls operation of the rear-wheel-driving motor, and
the electric power supply line is connected to the rear motor control unit at a location within the space defined by the suspension member.

8. The rear protection structure according to claim 7, wherein:
the second rear cross member is located under the rear wheel-driving motor and supports a rear lower portion of the rear wheel-driving motor, and
the connecting portion where the electric power supply line is connected to the rear wheel-driving motor is located in front of a rear end of the rear wheel-driving motor and overlaps the second rear cross member one upon another in plan view.

9. A rear protection structure for a vehicle which is equipped with an engine and a rear wheel-driving motor each as a traveling-driving power source of the vehicle and in which the rear wheel-driving motor and a rear suspension are arranged in a rear section of the vehicle and between right and left rear wheels of the vehicle, and a fuel tank for the engine and the rear wheel-driving motor are arranged adjacent to each other in a longitudinal direction of the vehicle, wherein:
the rear suspension supporting the rear wheel-driving motor has a suspension member supported on a body of the vehicle by rubber bushings, the suspension member defining a space formed by,
right and left side members extending in the longitudinal direction of the vehicle,
a first rear cross member connecting front portions of the right and left side members to each other and extending in a width direction of the vehicle, and
a second rear cross member connecting the portions of the right and left side members to each other and extending in the width direction of the vehicle,
the fuel tank is arranged in front of the rear wheel-driving motor with respect to the vehicle,
the first rear cross member is set up in front of the rear wheel-driving motor so as to extend between the rear wheel-driving motor and the fuel tank,
the rear wheel-driving motor and an electric power supply line connected to the rear wheel-driving motor are arranged within the space defined by the suspension member.

10. The rear protection structure according to claim 9, wherein
the second rear cross member is located under the rear wheel-driving motor and supports a rear lower portion of the rear wheel-driving motor.

* * * * *